United States Patent
Rangarajan et al.

(10) Patent No.: US 9,297,559 B2
(45) Date of Patent: Mar. 29, 2016

(54) ADAPTIVE THERMOELECTRIC COOLING IN A PROCESSOR

(71) Applicant: Intel Corporation, Santa Clara, CA (US)

(72) Inventors: Thanunathan Rangarajan, Bangalore (IN); Rahul Khanna, Portland, OR (US); Richard Marian Thomaiyar, Trichy (IN); Minh T Le, North Plains, OR (US)

(73) Assignee: INTEL CORPORATION, Santa Clara, CA (US)

( * ) Notice: Subject to any disclaimer, the term of this patent is extended or adjusted under 35 U.S.C. 154(b) by 185 days.

(21) Appl. No.: 14/036,655

(22) Filed: Sep. 25, 2013

(65) Prior Publication Data

US 2015/0082811 A1    Mar. 26, 2015

(51) Int. Cl.
*F25B 21/02*       (2006.01)
*G06F 1/20*        (2006.01)
*G06F 1/32*        (2006.01)

(52) U.S. Cl.
CPC ............... *F25B 21/02* (2013.01); *G06F 1/206* (2013.01); *G06F 1/324* (2013.01); *G06F 1/3287* (2013.01); *G06F 1/3296* (2013.01)

(58) Field of Classification Search
CPC ......... F25B 21/02; G06F 1/206; G06F 1/324; G06F 1/3287; G06F 1/3296
USPC .......... 62/3.2, 3.6, 3.7, 129; 165/104.33, 185; 361/695, 700; 700/79, 299; 219/499, 219/505
See application file for complete search history.

(56) References Cited

U.S. PATENT DOCUMENTS

| | | | | |
|---|---|---|---|---|
| 7,460,932 B2 * | 12/2008 | Johns et al. | | 700/299 |
| 7,508,671 B2 * | 3/2009 | Sauciuc et al. | | 361/700 |
| 7,725,238 B2 * | 5/2010 | Perkins | | 701/103 |
| 7,800,315 B2 * | 9/2010 | Shteynberg et al. | | 315/291 |
| 7,817,423 B2 * | 10/2010 | Morehead | | 361/700 |
| 8,027,798 B2 * | 9/2011 | Johns et al. | | 702/104 |
| 8,286,016 B2 * | 10/2012 | Monferrer et al. | | 713/322 |
| 2005/0078451 A1 | 4/2005 | Sauciuc et al. | | |
| 2009/0284911 A1 * | 11/2009 | Morehead | | 361/679.47 |
| 2010/0117579 A1 | 5/2010 | Culbert et al. | | |
| 2011/0072283 A1 * | 3/2011 | Monferrer et al. | | 713/300 |
| 2011/0161672 A1 * | 6/2011 | Martinez et al. | | 713/176 |
| 2011/0277361 A1 * | 11/2011 | Nichol et al. | | 40/541 |
| 2012/0079232 A1 * | 3/2012 | Hinton et al. | | 711/207 |
| 2012/0311360 A1 * | 12/2012 | Balasubramanian et al. | | 713/323 |
| 2012/0312030 A1 | 12/2012 | Lu | | |

OTHER PUBLICATIONS

EP office action issued in corresponding EP14186431.4 dated Feb. 9, 2015, (6 pages).
EP Search Report issued in corresponding EP14186431.4 dated Jun. 16, 2015, (13 pages).

* cited by examiner

*Primary Examiner* — Mohammad M Ali
(74) *Attorney, Agent, or Firm* — Trop, Pruner & Hu, P.C.

(57) ABSTRACT

In an embodiment, a processor includes a thermoelectric cooling (TEC) controller to obtain a platform cooling level associated with the processor; obtain a temperature associated with the processor; calculate a TEC power level based at least in part on the platform cooling level and the temperature; and provide the TEC power level to a TEC device associated with the processor, wherein the TEC device is to transfer heat from the processor to a heat sink. Other embodiments are described and claimed.

20 Claims, 14 Drawing Sheets

ADAPTIVE THERMOELECTRIC COOLING IN A PROCESSOR

TECHNICAL FIELD

Embodiments relate generally to cooling of electronic devices.

BACKGROUND

Conventionally, a computing device may include a cooling system to remove excess heat produced by electronic components. For example, the cooling system may include a fan to create air flows through the computing device. Such air flows may be used to cool components such as processors, power supplies, memory devices, etc.

DETAILED DESCRIPTION

Figure 1A:
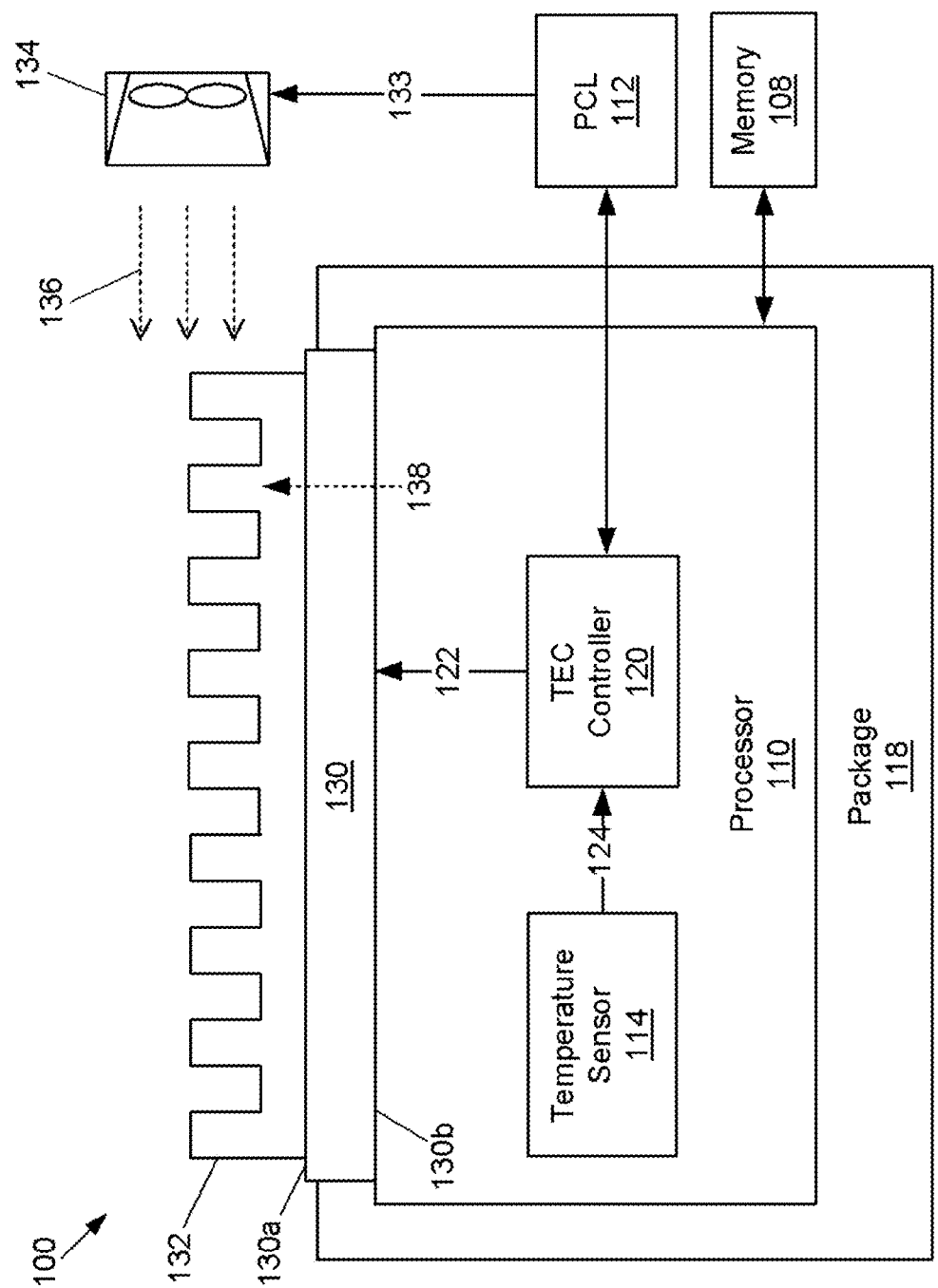
FIGS. 1A-1C are block diagrams in accordance with one or more embodiments.

Some computers may include thermoelectric cooling (TEC) devices to remove heat generated by internal components. Such TEC devices may include semiconductor materials which provide a temperature differential when receiving electric power. This temperature differential may increase heat flow from an internal component to a platform cooling system (e.g., air cooling, liquid cooling, etc.). However, conventional TEC devices are not coordinated to balance or match the heat flow provided by platform cooling systems. Further, conventional TEC devices are operated without awareness of time-variable heat loads on particular components or locations. Therefore, such TEC devices and/or platform cooling systems may be operated in an inefficient manner.

In accordance with some embodiments, a processor may include TEC logic to control a cooling system including a TEC device. The TEC logic may include functionality to coordinate the TEC device with a platform cooling system. Further, the TEC logic may include awareness of varying heat loads generated by instruction streams of the processor. As such, embodiments may provide improved levels of overall cooling efficiency.

Although the following embodiments may be described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below.

Moreover, the apparatus, methods, and systems described herein are not limited to physical computing devices, but may also relate to software optimizations for energy conservation and efficiency. As will become readily apparent in the description below, the embodiments of methods, apparatus, and systems described herein (whether in reference to hardware, firmware, software, or a combination thereof) are vital to a 'green technology' future, such as for power conservation and energy efficiency in products that encompass a large portion of the US economy.

Note that embodiments described herein may be independent of and/or complementary to an operating system (OS)-based mechanism, such as the Advanced Configuration and Power Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Referring to FIG. 1A, shown is a block diagram of a system 100 in accordance with one or more embodiments. In some embodiments, the system 100 may be all or a portion of an electronic device or component. For example, the system 100 may be included in a cellular telephone, a computer, a server, a network device, a controller, an appliance, a computing blade, a blade enclosure, etc.

As shown in FIG. 1A, in some embodiments, the system 100 may include a processor 110, memory 108, a fan 134, platform cooling logic (PCL) 112, a heat sink 132, and a thermoelectric cooling (TEC) device 130. In one or more embodiments, the processor 110 may include a temperature sensor 114 and a TEC controller 120. Further, the processor 110 may be coupled to the memory 108. The memory 108 may be any type of computer memory (e.g., dynamic random access memory (DRAM), static random-access memory (SRAM), non-volatile memory, etc.). In some embodiments, the processor 110 may be mounted on or within a package 118.

In one or more embodiments, the heat sink 132 may be a finned heat exchanger. As shown, the heat sink 132 may be convectively cooled by an air flow 136 provided by the fan 134. Further, in some embodiments, the PCL 112 may control the fan level 133 to vary the amount of convective cooling provided by the air flow 136. For example, the PCL 112 may set the fan level 133 to increase the speed of the fan 134, and therefore increase the convective cooling associated with the air flow 136. The fan level 133 may be, e.g., a power input level, a pulse width modulated signal, an indication or command for a particular fan speed, etc.). In some embodiments, each setting of the fan level 133 may be associated with a particular power cost.

In some embodiments, the TEC device 130 may include a first surface 130a in physical contact with the heat sink 132, and a second surface 130b in physical contact with the processor 110. In some embodiments, the TEC device 130 may receive a TEC power input 122 from the TEC controller 120. Further, when receiving the TEC power input 122, the TEC device 130 may provide a temperature differential between the first surface 130a and the second surface 130b. For example, in some embodiments, the TEC device 130 may decrease the temperature on the first surface 130a, and/or may increase the temperature on the second surface 130b. As such, the TEC device 130 may increase a heat flow 138 from the processor 110 to the heat sink 132.

In some embodiments, the TEC controller 120 may control a level of the TEC power input 122 to vary the heat flow 138 provided by the TEC device 130. For example, increasing the TEC level (i.e., the level of the TEC power input 122) may increase the heat flow 138 from the processor 110 to the heat sink 132. In another example, decreasing the TEC level may decrease the heat flow 138.

In one or more embodiments, the TEC controller 120 may determine the TEC level based at least in part on a temperature value 124 for all or a portion of the processor 110. Further, in some embodiments, this temperature value 124 may be obtained from a temperature sensor 114 included within (or in proximity to) the processor 110.

In some embodiments, the TEC controller 120 may interact and/or coordinate with the PCL 112. For example, the TEC controller 120 may obtain the fan level from the PCL 112, and may determine the TEC level based at least in part on the fan level. Further, the TEC controller 120 may coordinate with the PCL 112 to control or set the fan level. The functionality of the TEC controller 120 is described further below with reference to FIGS. 1B and 1C.

In some embodiments, the fan 134 may be a platform cooling device, meaning a cooling device included in and/or managed by a computing platform. For example, the fan 134 may be included in a computer enclosure, a motherboard, a server cabinet, a blade enclosure, a heat sink, etc. In another example, the fan 134 may be a dedicated fan managed by the PCL 112. As used herein, the term "platform cooling level" may refer generally to a fan level, and/or to any level or setting for a platform cooling device.

Note that, while FIG. 1A depicts the system 100 as including the fan 134, embodiments are not limited in this regard. In particular, it is contemplated that some embodiments may use other types of platform cooling devices instead of (or in combination with) the fan 134. For example, in some embodiments, a liquid cooling system may be used to cool the TEC device 130 or the heat sink 132.

Figure 1B:
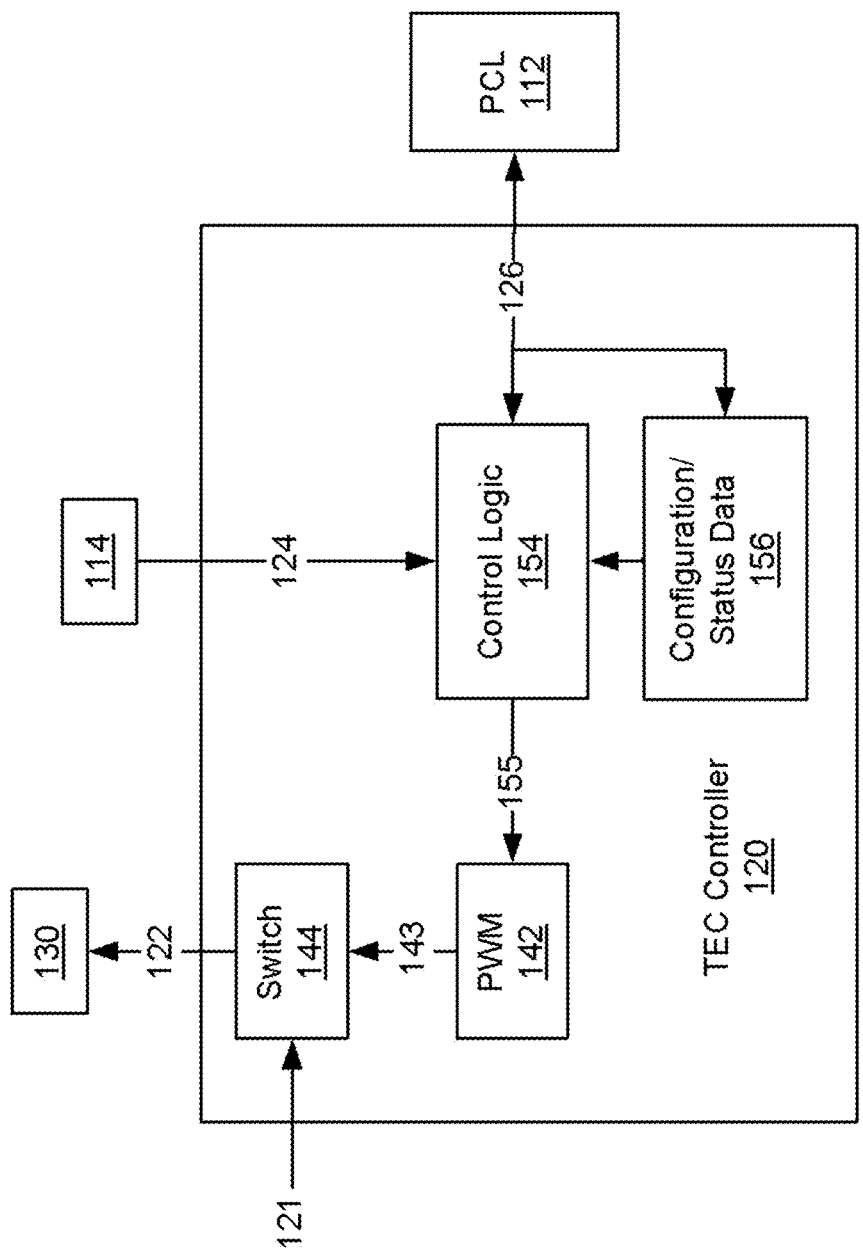

Referring now to FIG. 1B, shown is an example embodiment of a TEC controller 120. In this embodiment, the TEC controller 120 may include various components, including a switch 144, a pulse width modulation (PWM) unit 142, control logic 154, configuration/status data 156, and a dedicated interface 126 to the PCL 112.

In one or more embodiments, the control logic 154 may include functionality to control operation of the TEC device 130 based on the current state of the processor 110 and associated cooling systems. For example, the control logic 154 may obtain and evaluate the TEC power level, the fan power level, the temperature value 124, the current state of the PCL 112, etc. In some embodiments, the control logic 154 may be triggered periodically (e.g., according to a specified period). Alternatively, the control logic 154 may be triggered by internal or external signals, by processor or platform events, etc.

In one or more embodiments, the control logic 154 may obtain the fan power level using the dedicated interface 126. Optionally, the fan power level may be stored in configuration/status data 156 before being read by the control logic 154. In some embodiments, the control logic 154 may obtain the temperature value 124 from the temperature sensor 114. Further, the control logic 154 may obtain the current TEC power level from the configuration/status data 156 or internal memory (e.g., one or more registers included the control logic 154). In some embodiments, the control logic 154 may evaluate these inputs using abstract or normalized metrics. For example, some or all of the TEC power level, the fan power level, and the temperature value 124 may be expressed as abstract values or levels (e.g., Level 1, Level 2, Level 3, etc.). Such abstract metrics may enable the TEC controller 120 to be used in a platform-agnostic manner (e.g., without being modified and/or adapted to a specific platform architecture).

In one or more embodiments, the control logic 154 may evaluate one or more inputs to determine a TEC power level. For example, the control logic 154 may compare the temperature value 124 to a defined range or threshold(s), and may thereby determine whether the TEC power level should be increased, decreased, or maintained.

In some embodiments, the control logic 154 may determine the TEC and fan levels such that the TEC heat flow is balanced with the cooling effect of the fan. For example, referring to FIG. 1A, the heat flow 138 provided by the TEC device 130 may be balanced with the convective heat dissipation provided by the fan 134 (i.e., the cooling of heat sink 132 by air flow 136). Further, in some embodiments, the control logic 154 may use the dedicated interface 126 to communicate the determined fan level to the PCL 112, such that the PCL 112 may control and/or set the level of the fan 134.

In one or more embodiments, the control logic 154 may determine the TEC level and the fan level using one or more balancing algorithms. For example, the control logic 154 may use Pareto optimization algorithms that attempt to reduce the combined power consumption of the TEC device 130 and the fan 134, using a given overall cooling rate as a set point. In other examples, the control logic 154 may use Fuzzy Logic, Proportional Integral Derivative (PID), and/or Model Predictive Control (MPC) algorithms. In some embodiments, such algorithms may assume a constant CoP, and may drive the combined action of the TEC device 130 and the fan 134 to reduce energy consumption and increase the net cooling rate.

In one or more embodiments, the coefficient of performance (CoP) of the TEC device 130 may be expressed by the following formula:

$$CoP = Q_c / P_{in}$$

In the above formula, $Q_c$ is the rate of heat generated by the processor 110, and $P_{in}$ is the input power to the TEC device 130. Further, in some embodiments, the rate of heat may be expressed by the following formula:

$$Q_c = I*S*T_c - K(T_h - T_c) - (R*I^2)/2$$

In the above formula, I is the current input to the TEC device 130, S is the Seebeck constant, K is the conductance of the TEC device 130, R is the resistance of the TEC device 130, $T_h$ is the temperature at the hot side of the TEC device 130, and $T_c$ is the temperature at the cold side of the TEC device 130. The first term in this equation represents the Peltier cooling action of the TEC device 130, the second term represents the heat leakage from the hot side to the cold side of the TEC device 130, and the third term represents the Joule effect. In one or more embodiments, the desired set point of the TEC device 130 (e.g., providing cooling at reduced power consumption) may be determined by minimizing the second and third terms (i.e., minimizing heat leakage and the Joule effect).

In one or more embodiments, the control logic 154 may use a multi-objective optimization approach. An example of this approach is provided below.

At every sampling instant, there is a heterogeneous vector S={X, Y}, where X={$X_1$, ..., $X_n$}, and Y={$Y_1$, ..., $Y_m$}. Assume X represents fan speed inputs for n fans, and Y represents TEC duty cycle inputs for m TEC devices. Further, X and Y may be expressed in a common unit (e.g., % PWM).

In some embodiments, the objective may be to minimize a cost function $f(S)$, subject to the constraint $g(S) \leq T_{th}(S)$. The cost function $f(S)$ may correspond to the total cost of operating the combined set of cooling devices at a specified set of corresponding values. Here, $g(S)$ may be a constraint function that returns the estimated CPU die temperature when combined cooling S is applied to the system. Further, $T_{th}(S)$ may be a maximum die temperature threshold for cooling S. In various embodiments of this invention, the cost function $f(S)$ can be constructed in terms of the energy consumption of running fans at levels X, and the energy consumption of operating TEC at levels Y.

In one or more embodiments, the control logic 154 may provide an indication 155 of the determined TEC level to the PWM unit 142. Further, the PWM unit 142 may generate a duty cycle signal 143 (e.g., a given number of pulses per time unit) based on the TEC power level. In some embodiments, the duty cycle signal 143 may also be based on minimizing both heat leakage and the Joule effect (i.e., the second and third terms of the $Q_c$ formula listed above).

As shown, the duty cycle signal 143 may be provided to the switch 144. In some embodiments, the switch 144 may switch a power input 121 on and off based on the duty cycle signal 143, and may output a pulsed power supply 122. In one or more embodiments, the pulsed power supply 122 may power the TEC device 130 at the determined TEC level.

Figure 1C:
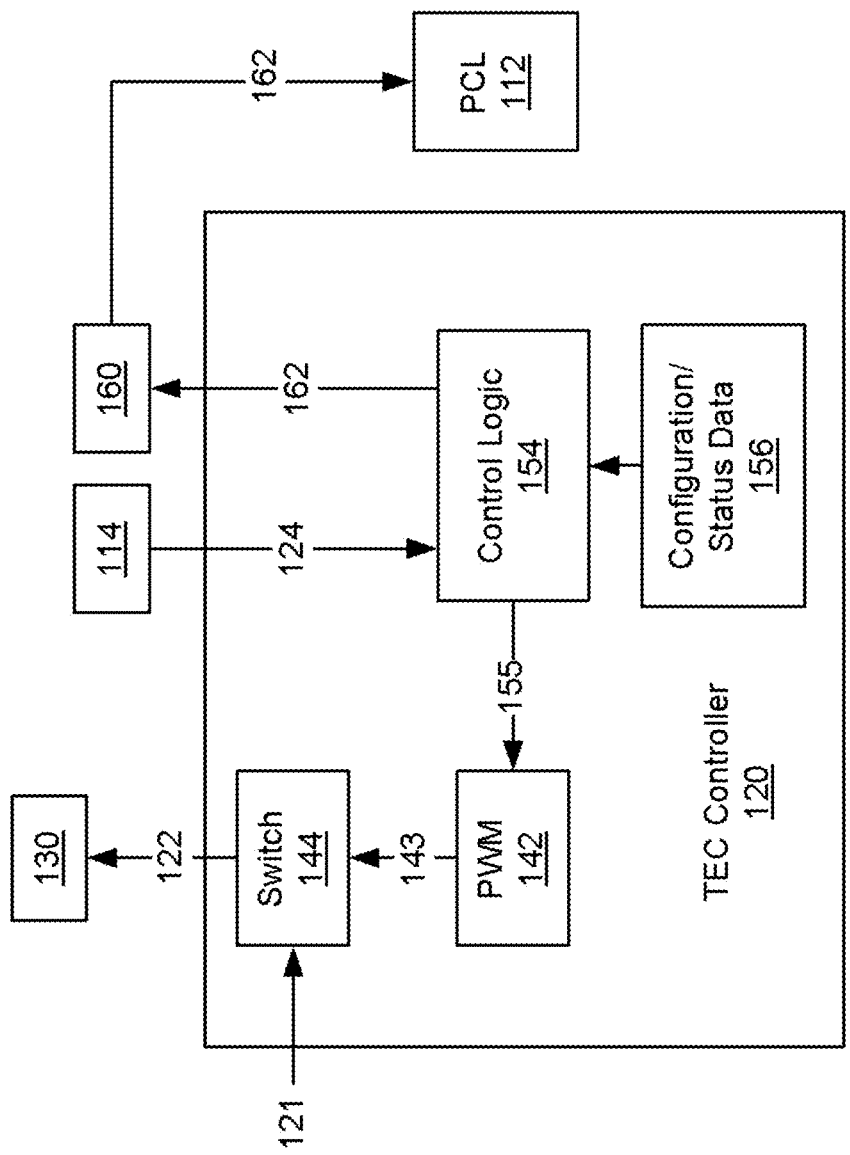

Referring now to FIG. 1C, shown is another example embodiment of the TEC controller 120. In this embodiment, the functionality of the TEC controller 120 to provide power to the TEC device 130 may be similar to that described above with reference to FIG. 1B. For example, the duty cycle signal 143, the indication 155, and/or the pulsed power supply 122 may be obtained as described above with reference to FIG. 1B. However, in this embodiment, the control logic 154 may not communicate directly with the PCL 112, and may instead use an existing temperature data path. For example, assume that the PCL 112 is configured to read a temperature value from a temperature register 160, and to control the fan 134 based on this temperature value. As shown, in such embodiments, the control logic 154 may calculate a virtual temperature value 162, and may store the virtual temperature value 162 in the temperature register 160. In some embodiments, the virtual temperature value 162 may be calculated to cause the PCL 112 to power the fan 134 at a desired fan level. As such, the virtual temperature value 162 may differ from the actual temperature of the processor 110 (e.g., the temperature value 124 measured by the temperature sensor 114).

Note that, in the embodiment shown in FIG. 1C, the TEC controller 120 may communicate with the PCL 112 without requiring a separate interface (e.g., dedicated interface 126 shown in FIG. 1B). Thus, in such embodiments, the TEC controller 120 may be implemented in a platform agnostic manner.

Figure 2A:
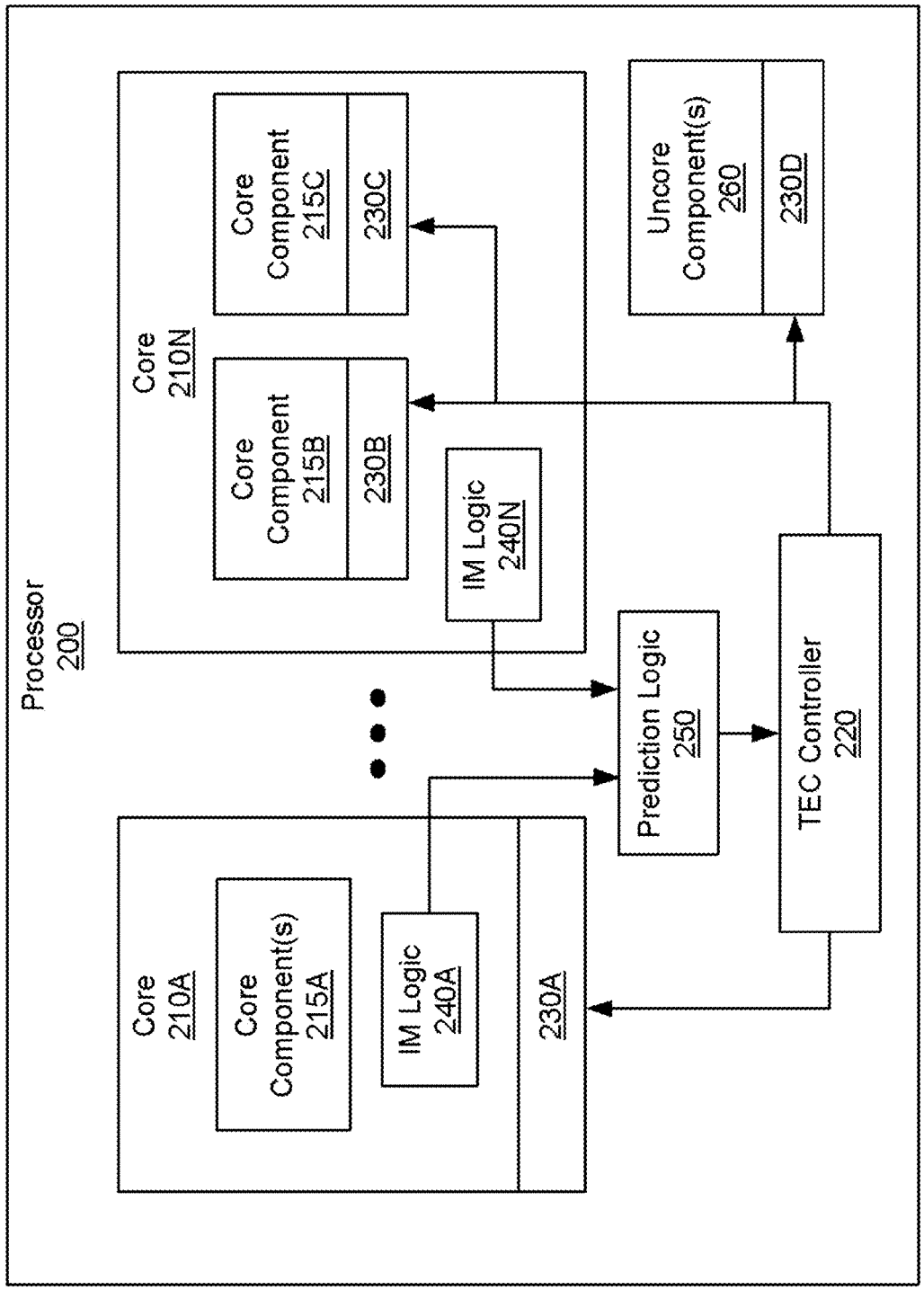
FIGS. 2A-2B are block diagrams in accordance with one or more embodiments.

Referring now to FIG. 2A, shown is a block diagram of a processor 200 in accordance with one or more embodiments. In some embodiments, the processor 200 may correspond generally to the processor 110 shown in FIG. 1A.

As shown, the processor 200 may include cores 210A-210N. For example, in some embodiments, the cores 210A-210N may be included in multiple tiles within a single die of the processor 200. Each of the cores 210A-210N may include one or more core components 215. Further, the processor 200 may include prediction logic 250, a TEC controller 220, and uncore component 260. In some embodiments, the TEC controller 220 may correspond generally to the TEC controller 120 shown in FIGS. 1A-1C.

In one or more embodiments, the processor 200 may include any number of localized TEC devices 230. In some embodiments, each TEC device 230 may be a thin-film or super-lattice cooling module. Further, each TEC device 230 may be configured to cool a particular portion or component of the processor 200. For example, as shown, a first TEC device 230B may cool a first core component 215B of core 210N, and a second TEC device 230C may cool a second core component 215C of core 210N. In another example, a third TEC device 230A may cool all of core 210A, and a fourth TEC device 230D may cool the uncore component 260.

In some embodiments, each core 210 may include instruction monitoring (IM) logic 240. The IM logic 240 may include functionality to monitor an instruction stream for the respective core 210, and to identify upcoming portions of the instruction stream that are associated with elevated heat loads (referred to herein as "hot portions"). Further, upon identifying such hot portions of the instruction stream, the IM logic 240 may send a notification signal to the prediction logic 250. The functionality of the IM logic 240 is described further below with reference to FIG. 2B.

In one or more embodiments, the prediction logic 250 may include functionality to aggregate the notification signals received from the various cores 210. Further, the prediction logic 250 may analyze the received notification signals to determine localized cooling requirements for various portions of the processor 200. The prediction logic 250 may generate a hint signal to communicate these cooling requirements to the TEC controller 220. For example, the prediction logic 250 may generate the hint signal based on an overall TEC power budget, based on the portion(s) of the processor 200 which demands the most urgent cooling, etc. In some embodiments, the hint signal may include the time of arrival of hot portions of the instruction stream, the duration of each hot portion of the instruction stream, the components of the processor 200 affected by each hot portion, the net energy consumption associated with each hot portion of the instruction stream, etc.

In one or more embodiments, the TEC controller 220 may control the power levels of various TEC devices 230 based on the hint signals provided by the prediction logic 250. Further, in some embodiments, the TEC controller 220 may adjust such power levels to match cooling requirements specified in the hint signals. For example, assume that the IM logic 240A has determined that the core 210A has received a first set of instructions that will result in a heavy processing load on the core 210A during a first time period. Thus, the IM logic 240A sends a notification signal to the prediction logic 250, which in turn signals the TEC controller 220. Accordingly, in this example, the TEC controller 220 may increase the power input to the TEC device 230A during the first time period. In another example, assume that the IM logic 240N has determined that core 210N is to process instructions during a second time period that will result in a heavy processing load on core component 215B, and will result in a light processing load on core component 215C. Accordingly, during the second time period, the TEC controller 220 may increase power to TEC device 230B, and may decrease or shut off power to TEC device 230C. In some embodiments, the TEC controller 220 may adjust the power level provided to each TEC device 230 in a just-in-time manner (i.e., synchronized to the arrival of a particular portion of the instruction stream).

Figure 2B:
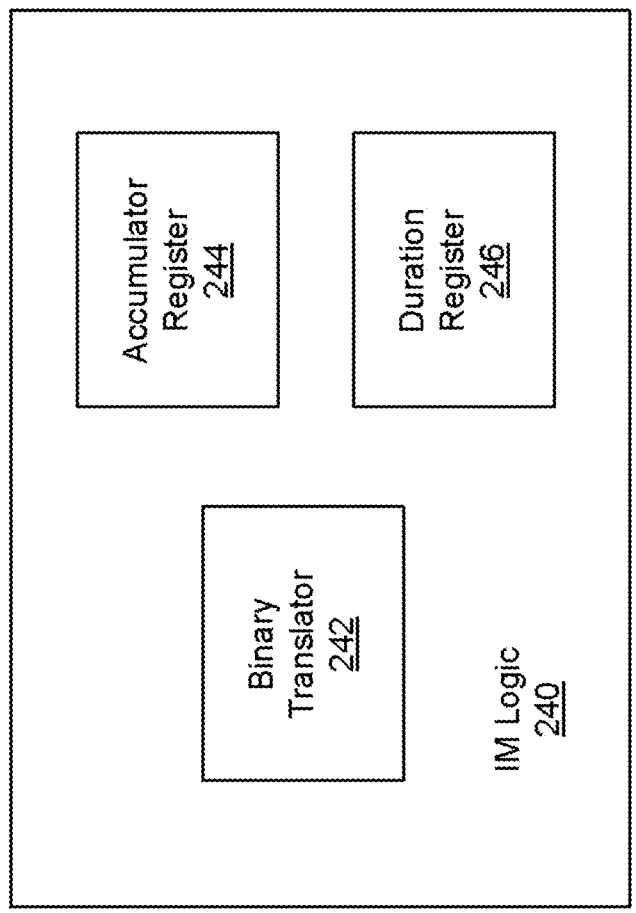

Referring now to FIG. 2B, shown is an example embodiment of the IM logic 240. In this embodiment, the IM logic 240 may include various components, including a binary translator 242, an accumulator register 244, and a duration register 246.

In one or more embodiments, the binary translator 242 may be in-built logic or microcode firmware including functionality to determine the activity and energy value of instructions in an instruction stream, and to determine a net energy gain. For example, the binary translator 242 may determine that incoming floating point intensive instructions would result in an increase in power consumption in the floating point unit (FPU) of the processor 200. In another example, the binary translator 242 may detect specific instructions (e.g., SSE/AVX instructions), or phases in the incoming stream of instructions, that are predefined as being power-intensive. In yet another example, the binary translator 242 may estimate the accumulated instruction energy produced by the instruction stream, and may determine the net deduced energy needs of these instructions. In some embodiments, the energy associated with each instruction may be computed as anticipated energy, or in terms of digital activity.

In some embodiments, the accumulator register 244 may accumulate the instruction energy values provided by the binary translator 242. Further, the duration register 246 may store the durations of various portions of the instruction stream (e.g., "hot" or "cold" instructions). In some embodiments, such durations may be recorded as a number of primary clock cycles associated with each portion.

In one or more embodiments, the IM logic 240, prediction logic 250, TEC controller 220, and localized TEC devices 230 may include functionality to provide TEC cooling to particular components for specific time periods. As such, this functionality may enable energy efficient TEC cooling. This functionality may also include pre-cooling a hot core in anticipation of expected high load portions of the instruction stream. In addition, this functionality may include cooling a running core in a lock-stepped mode during the lifetime of the hot portion, in order to regain lost performance headroom using Dynamic Voltage and Frequency Scaling (DVFS). Further, this functionality may reduce the heat backpressure associated with the Joule Effect. Furthermore, this functionality may reduce the need for context switching that is associated with schemes such as temperature-aware thread migration.

Figure 3A:
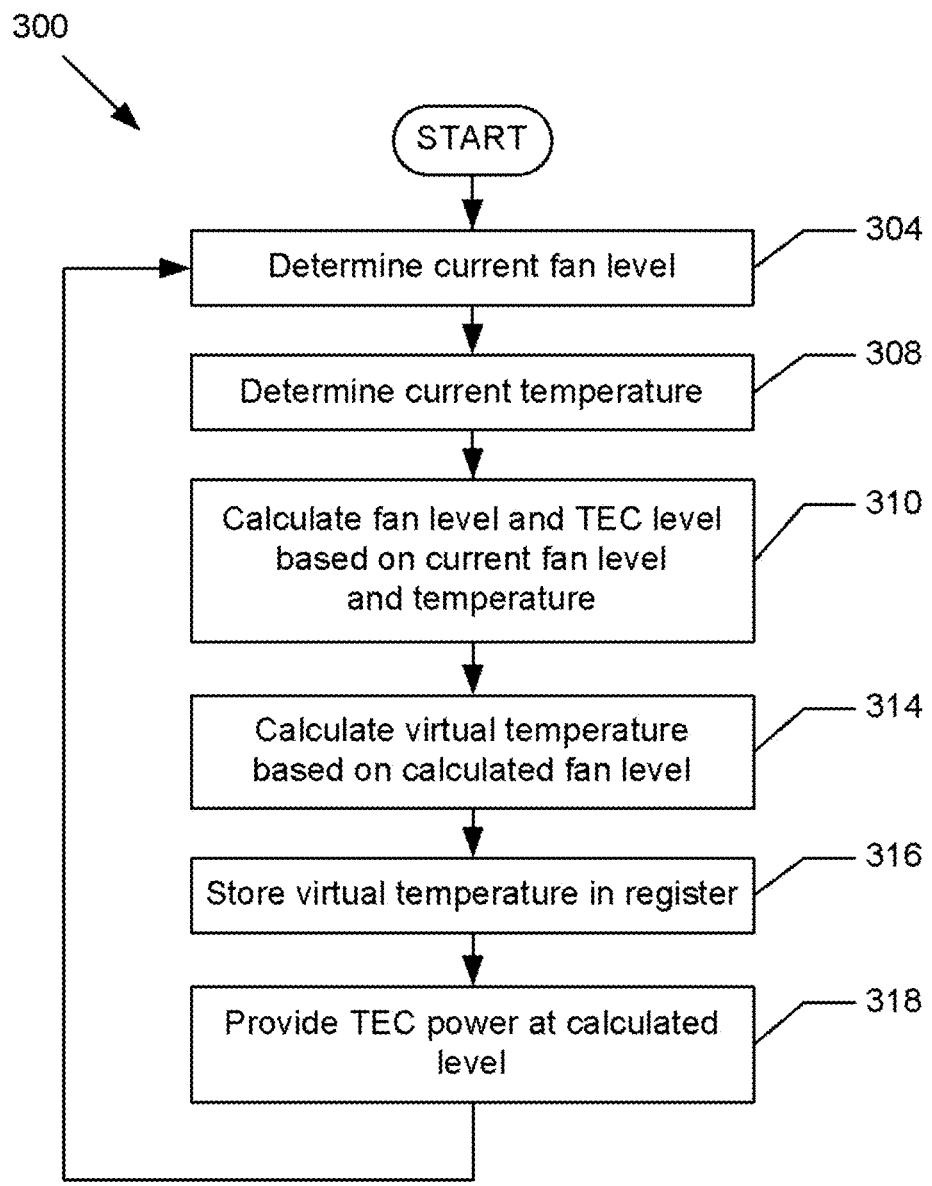
FIGS. 3A-3D are sequences in accordance with one or more embodiments.

Referring now to FIG. 3A, shown is a sequence 300 for controlling a TEC power level, in accordance with one or more embodiments. In one or more embodiments, the sequence 300 may be part of the TEC controller 120 shown in FIG. 1C. The sequence 300 may be implemented in hardware, software, and/or firmware. In firmware and software embodiments it may be implemented by computer executed instructions stored in a non-transitory computer readable medium, such as an optical, semiconductor, or magnetic storage device.

At step 304, the current fan level may be determined. For example, referring to FIG. 1A, the TEC controller 120 may determine the current fan level 133 provided to the fan 134.

At step 308, a current temperature may be determined. For example, referring to FIG. 1A, the TEC controller 120 may read the temperature value 124 from the temperature sensor 114 included in the processor 110.

At step 310, fan and TEC levels may be calculated based on the current fan level and/or temperature. For example, referring to FIG. 1A, the TEC controller 120 may determine a new TEC power level based at least in part on the temperature value 124. Further, the TEC controller 120 and/or the PCL 112 may determine a new fan level. In some embodiments, determining the TEC and fan levels may involve using a balancing algorithm to balance the TEC heat flow and the fan heat flow.

At step 314, a virtual temperature value may be calculated based on the calculated fan power level. For example, referring to FIG. 1C, the TEC controller 120 may determine the virtual temperature value 162 that will cause the PCL 112 to power the fan 134 at the calculated fan power level.

At step 316, the virtual temperature value may be stored in a register. For example, referring to FIG. 1C, the TEC controller 120 may store the virtual temperature value 162 in the temperature register 160.

At step 318, the TEC power input may be provided at the calculated level. For example, referring to FIG. 1C, the control logic 154 may provide an indication 155 of the determined TEC power level to the PWM unit 142. In some embodiments, the PWM unit 142 may provide the duty cycle signal 143 to the switch 144. Further, the switch 144 may switch the power input 121 based on the duty cycle signal 143, thereby providing the pulsed power supply 122 to the TEC device 130. After step 318, the sequence 300 ends.

Figure 3B:
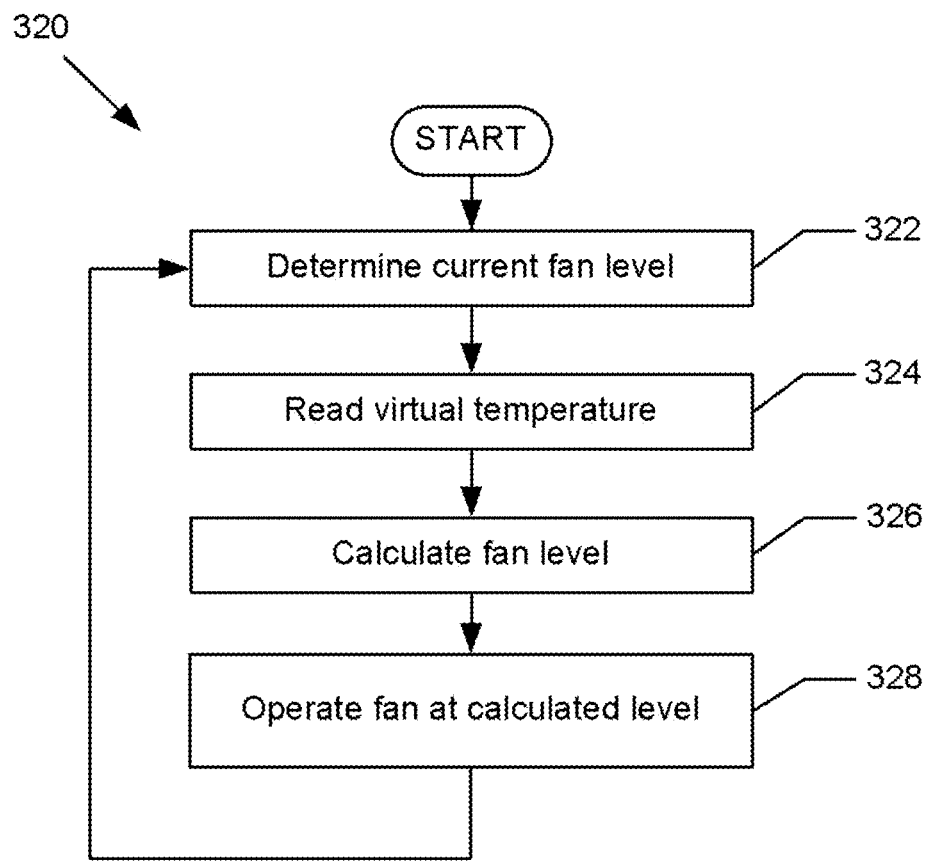

Referring now to FIG. 3B, shown is a sequence 320 for controlling a fan power level, in accordance with one or more embodiments. In one or more embodiments, the sequence 320 may be part of the PCL 112 shown in FIGS. 1A and 1C. The sequence 320 may be implemented in hardware, software, and/or firmware. In firmware and software embodiments it may be implemented by computer executed instructions stored in a non-transitory computer readable medium, such as an optical, semiconductor, or magnetic storage device.

At step 322, the current fan level may be determined. For example, referring to FIG. 1A, the PCL 112 may determine the level of the fan level 133 provided to the fan 134.

At step 324, a virtual temperature value may be read from a register. For example, referring to FIG. 1C, the PCL 112 may read the virtual temperature value 162 stored in the temperature register 160.

At step 326, a fan level may be calculated based on the virtual temperature value. For example, referring to FIG. 1C, the PCL 112 may determine the fan level corresponding to the virtual temperature value 162.

At step 328, the fan may be operated at the calculated level. For example, referring to FIG. 1A, the fan 134 may be operated according to the fan level 133. After step 328, the sequence 320 ends.

Figure 3C:
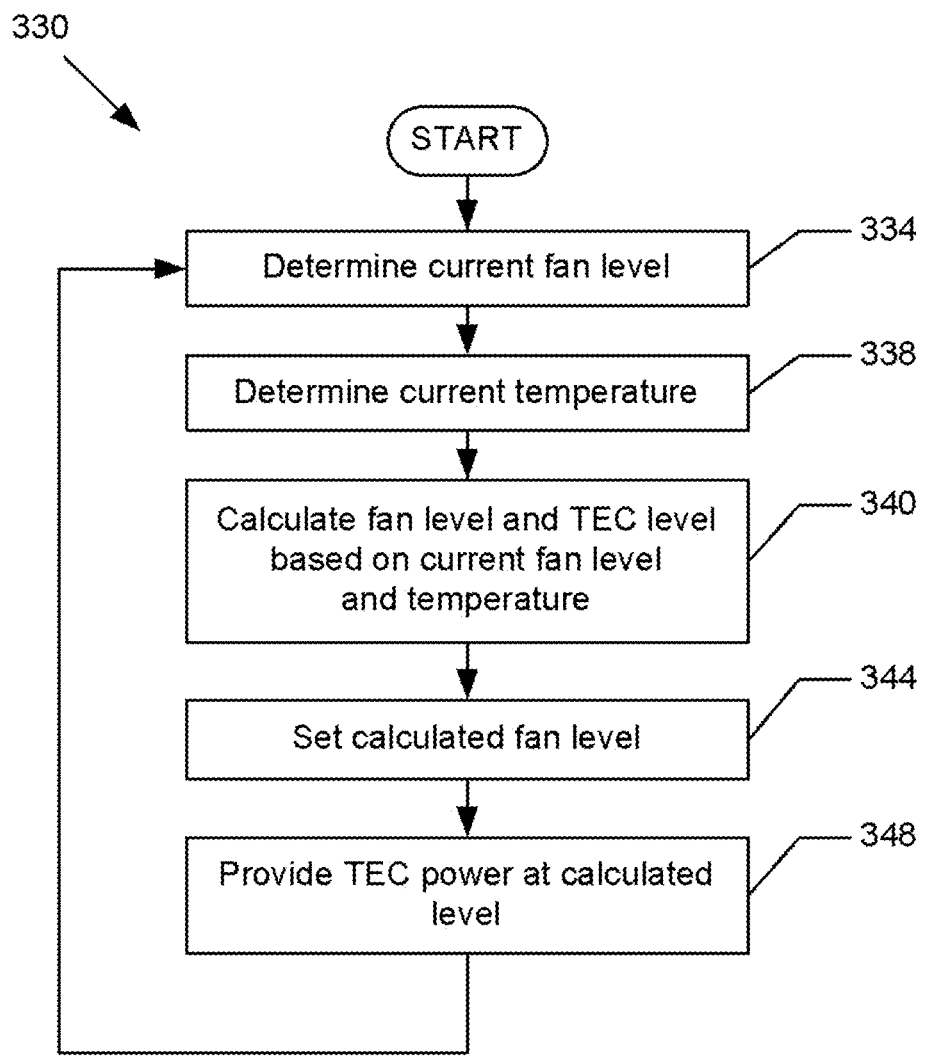

Referring now to FIG. 3C, shown is a sequence 330 for controlling a TEC power level, in accordance with one or more embodiments. In one or more embodiments, the sequence 330 may be part of the TEC controller 120 shown in FIG. 1B. The sequence 330 may be implemented in hardware, software, and/or firmware. In firmware and software embodiments it may be implemented by computer executed instructions stored in a non-transitory computer readable medium, such as an optical, semiconductor, or magnetic storage device.

At step 334, the current fan level may be determined. For example, referring to FIG. 1A, the TEC controller 120 may determine the level of the fan level 133 provided to the fan 134. In some embodiments, the TEC controller 120 may use the dedicated interface 126 (shown in FIG. 1B) to determine the current fan level from the PCL 112.

At step 338, a current temperature may be determined. For example, referring to FIG. 1A, the TEC controller 120 may read the temperature value 124 from the temperature sensor 114 included in the processor 110.

At step 340, fan and TEC levels may be calculated based on the current fan level and/or temperature. For example, referring to FIG. 1A, the TEC controller 120 may determine a new TEC power level based at least in part on the temperature value 124. Further, the TEC controller 120 and/or the PCL 112 may determine a new fan level.

At step 344, the calculated fan level may be set. For example, referring to FIG. 1B, the TEC controller 120 use the dedicated interface 126 to program the PCL 112 to operate the fan 134 at the calculated fan level.

At step 348, the TEC power input may be provided at the calculated level. For example, referring to FIG. 1A, the TEC controller 120 may provide the pulsed power supply 122 to the TEC device 130 at the calculated TEC level. After step 348, the sequence 330 ends.

Figure 3D:
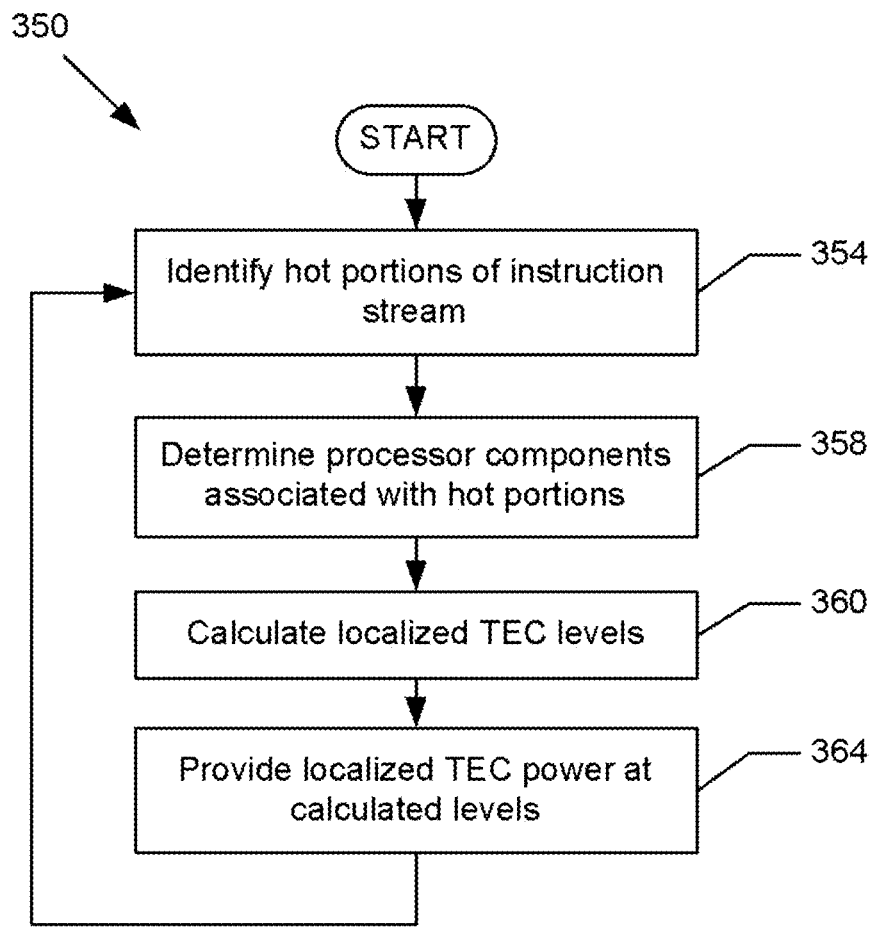

Referring now to FIG. 3D, shown is a sequence 350 for controlling localized TEC devices, in accordance with one or more embodiments. In one or more embodiments, the sequence 350 may be part of the TEC controller 220, prediction logic 250, and/or IM logic 240 shown in FIGS. 2A-2B. The sequence 350 may be implemented in hardware, software, and/or firmware. In firmware and software embodiments it may be implemented by computer executed instructions stored in a non-transitory computer readable medium, such as an optical, semiconductor, or magnetic storage device.

At step 354, hot portions of an instruction stream may be identified. For example, referring to FIG. 2A, the IM logic 240A may analyze an instruction stream for the core 210A, and may determine the heat load associated with each instruction.

At step 358, processor components associated with the hot portions may be determined. For example, referring to FIG. 2A, the IM logic 240 and/or the prediction logic 250 may determine one or more processor components (e.g., core 210A, core component 215C, uncore component 260, etc.) affected by a particular hot portion of the instruction stream. In some embodiments, the prediction logic 250 may send a hint signal to communicate cooling requirements to the TEC controller 220.

At step 360, localized TEC levels may be calculated. For example, referring to FIG. 2A, the TEC controller 220 may determine the TEC level for the TEC device 230C based on an expected heat load on the core component 215C.

At step 364, localized TEC power inputs may be provided at the calculated levels. For example, referring to FIG. 2A, the TEC controller 220 may provide a power input level to the TEC device 230C at the calculated TEC level. After step 364, the sequence 350 ends.

Note that the examples shown in FIGS. 1A-1C, 2A-2B, and 3A-3D are provided for the sake of illustration, and are not intended to limit any embodiments. For instance, while embodiments are shown as including platform cooling systems based on fans (e.g., fan 134), other platform cooling systems may be used (e.g., a liquid cooling system). Further, while embodiments may be shown in simplified form for the sake of clarity, embodiments may include any number and/or arrangement of processors, cores, and/or additional components (e.g., buses, storage media, connectors, power components, buffers, interfaces, etc.). It is contemplated that specifics in the examples shown in FIGS. 1A-1C, 2A-2B, and 3A-3D may be used anywhere in one or more embodiments.

Figure 4:
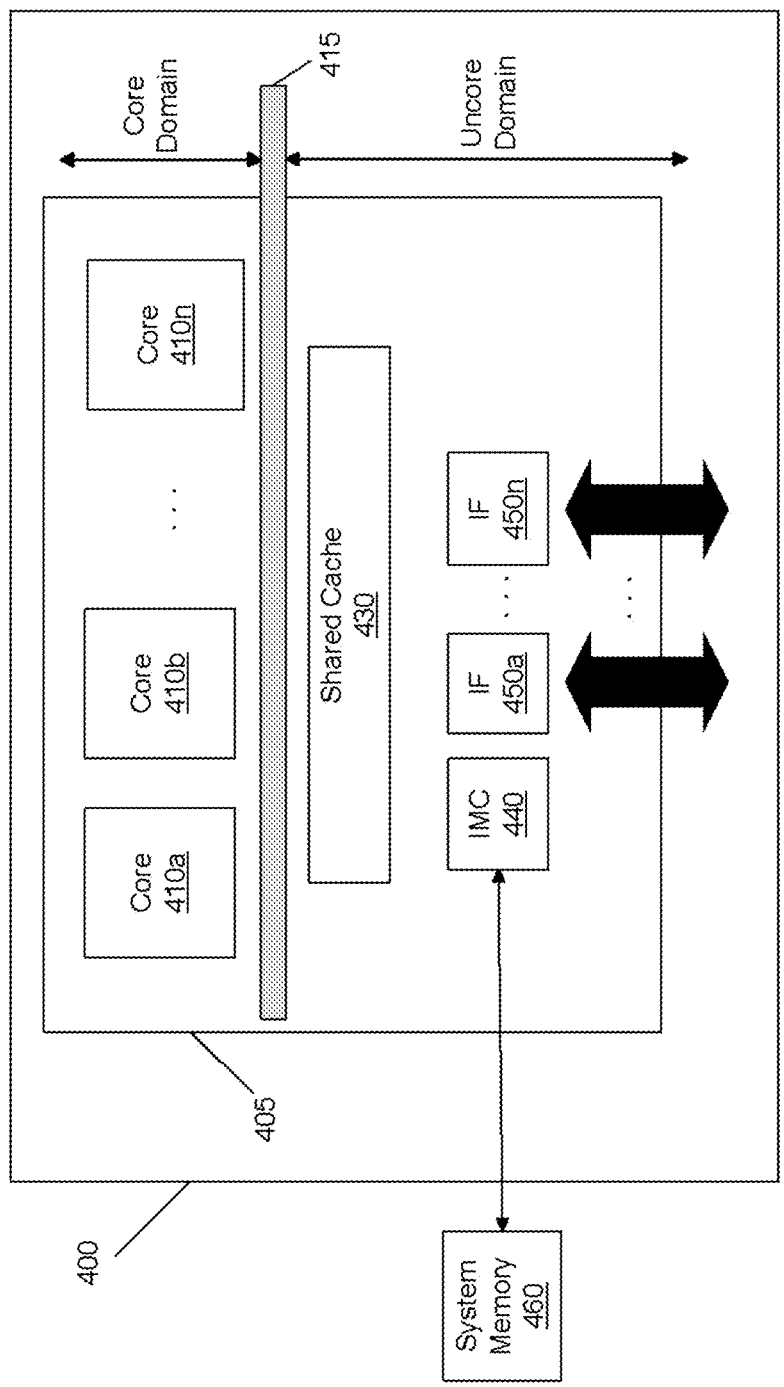
FIG. 4 is a block diagram of a processor in accordance with an embodiment of the present invention.

Referring now to FIG. 4, shown is a block diagram of a processor in accordance with an embodiment of the present invention. As shown in FIG. 4, the processor 400 may be a multicore processor including first die 405 having a plurality of cores 410a-410n of a core domain. The various cores 410a-410n may be coupled via an interconnect 415 to a system agent or uncore domain that includes various components. As seen, the uncore domain may include a shared cache 430. In addition, the uncore may include an integrated memory controller 440, a power control unit (PCU) 470, and various interfaces 450.

Although not shown for ease of illustration in FIG. 4, in some embodiments, the processor 400 may include some or all of the functionality of the TEC controller 120 and/or the TEC device 130 described above with reference to FIGS. 1A-1C. Further, in some embodiments, the processor 400 may include some or all of the functionality of the IM logic 240, prediction logic 250, TEC controller 220, and localized TEC devices 230 described above with reference to FIGS. 2A-2B.

With further reference to FIG. 4, the processor 400 may communicate with a system memory 460, e.g., via a memory bus. In addition, by interfaces 450, connection can be made to another processor, or various off-package components such as peripheral devices, mass storage and so forth. While shown with this particular implementation in the embodiment of FIG. 4, the scope of the present invention is not limited in this regard.

Figure 5:
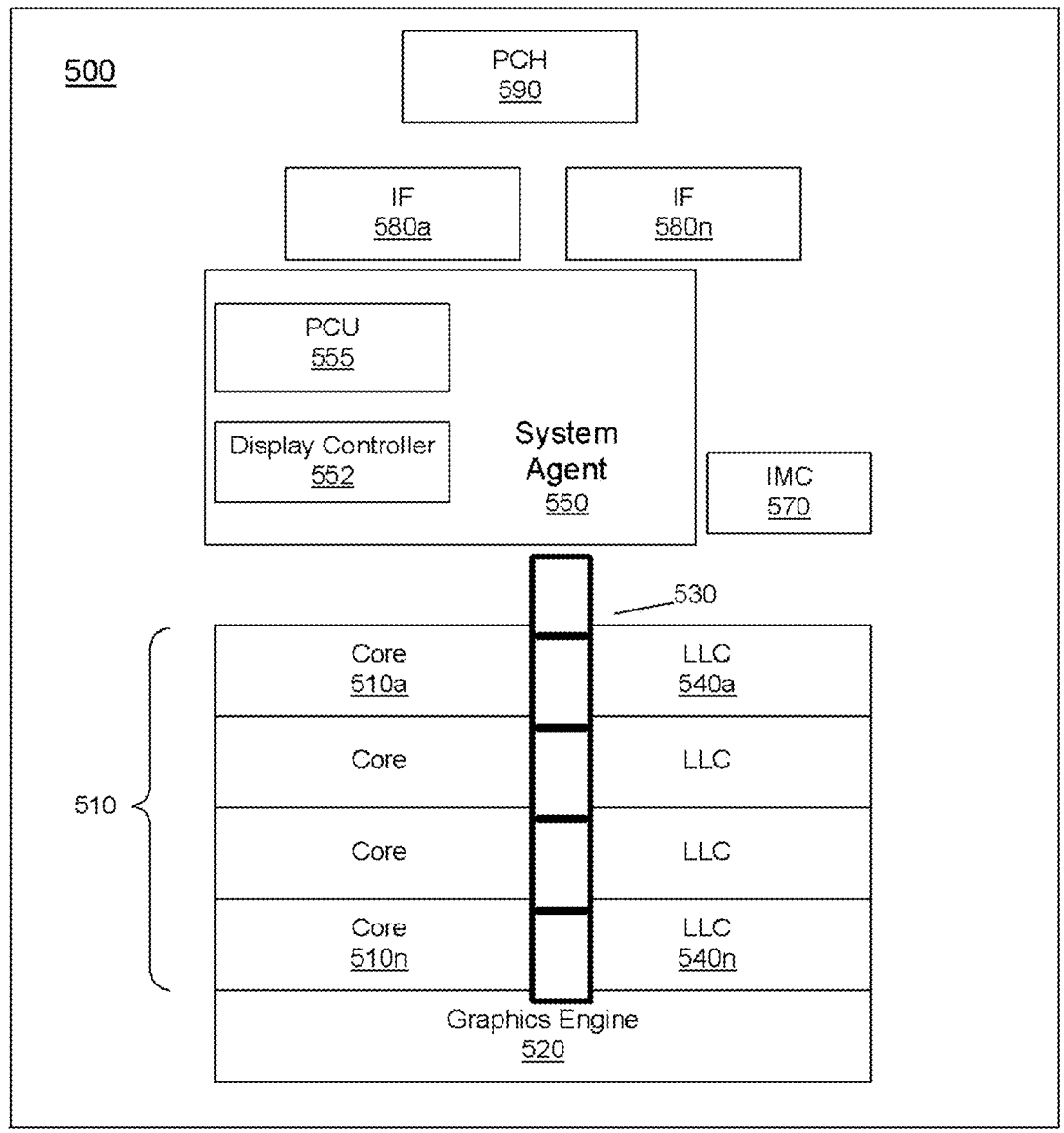
FIG. 5 is a block diagram of a multi-domain processor in accordance with another embodiment of the present invention.

Referring now to FIG. 5, shown is a block diagram of a multi-domain processor in accordance with another embodiment of the present invention. As shown in the embodiment of FIG. 5, processor 500 includes multiple domains. Specifically, a core domain 510 can include a plurality of cores 510a-510n, a graphics domain 520 can include one or more graphics engines, and a system agent domain 550 may further be present. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) 540a-540n.

In various embodiments, LLC 540 may be shared amongst the cores and the graphics engine, as well as various media processing circuitry.

As seen, a ring interconnect 530 thus couples the cores together, and provides interconnection between the cores, graphics domain 520 and system agent circuitry 550. In some embodiments, the ring interconnect 530 may be a multiplexor or crossbar device. In the embodiment of FIG. 5, system agent domain 550 may include display controller 552 which may provide control of and an interface to an associated display. As further seen, system agent domain 550 may also include a power control unit 555 to allocate power to the CPU and non-CPU domains.

As further seen in FIG. 5, processor 500 can further include an integrated memory controller (IMC) 570 that can provide for an interface to a system memory, such as a dynamic random access memory (DRAM). Multiple interfaces 580a-580n may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. As further seen, a peripheral controller hub (PCH) 590 may also be present within the processor 500, and can be implemented on a separate die, in some embodiments. Alternatively, in some embodiments, the PCH 590 may be external to the processor 500. Although shown at this high level in the embodiment of FIG. 5, understand the scope of the present invention is not limited in this regard.

Although not shown for ease of illustration in FIG. 5, in some embodiments, the processor 500 may include some or all of the functionality of the TEC controller 120 and/or the TEC device 130 described above with reference to FIGS. 1A-1C. Further, in some embodiments, the processor 500 may include some or all of the functionality of the IM logic 240, prediction logic 250, TEC controller 220, and localized TEC devices 230 described above with reference to FIGS. 2A-2B.

Figure 6:
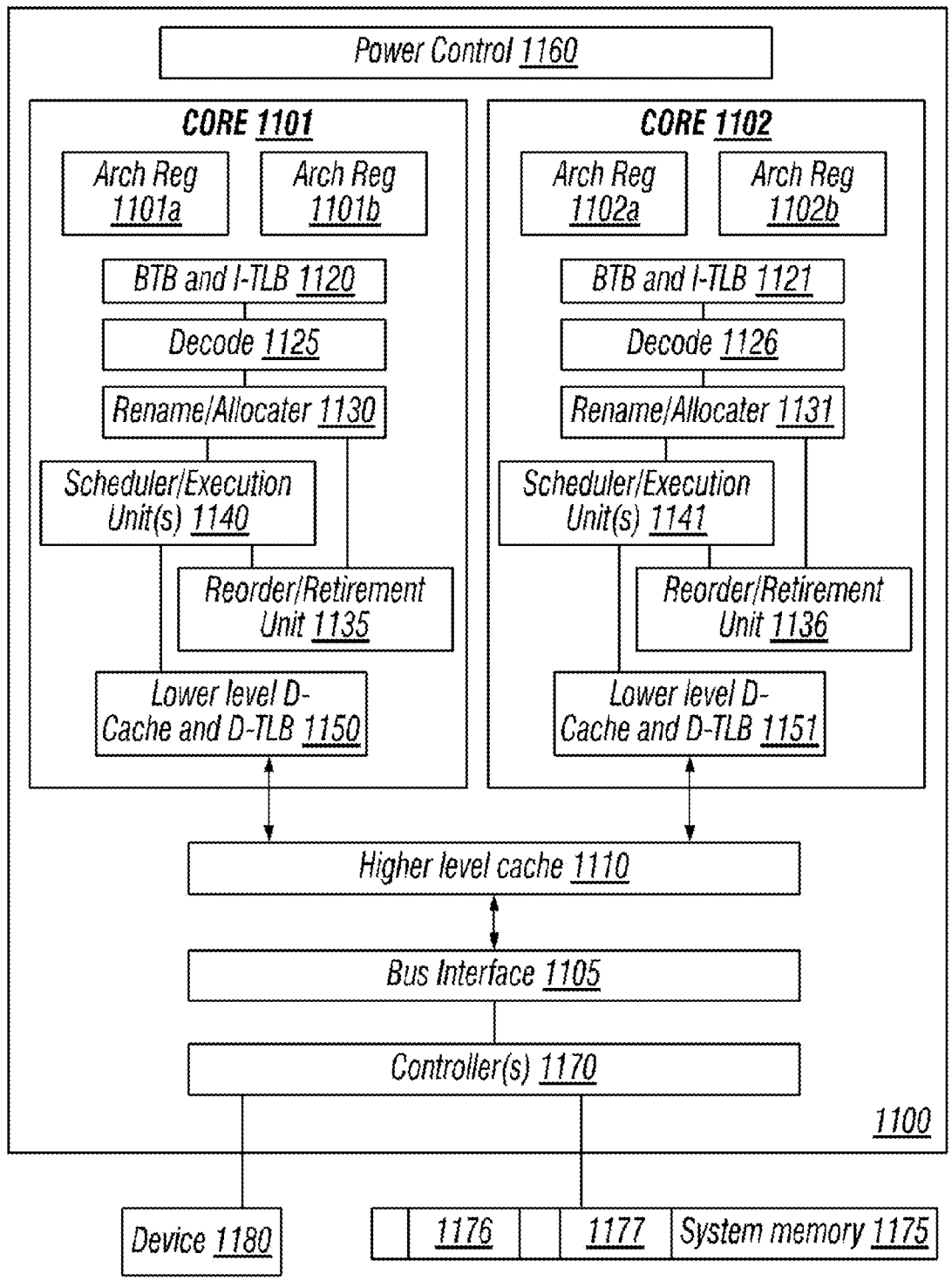
FIG. 6 is a block diagram of an embodiment of a processor including multiple cores.

Referring to FIG. 6, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 6, includes two cores, cores 1101 and 1102. Here, cores 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As shown, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above.

As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 6, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101*a*, 1101*b*, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101*a* and 1101*b* are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces. In the depicted configuration, processor 1100 also includes bus interface module 1105 and a power controller 1160, which may perform power management in accordance with an embodiment of the present invention.

Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Although not shown for ease of illustration in FIG. 6, in some embodiments, the processor 1100 may include some or all of the functionality of the TEC controller 120 and/or the TEC device 130 described above with reference to FIGS. 1A-1C. Further, in some embodiments, the processor 1100 may include some or all of the functionality of the IM logic 240, prediction logic 250, TEC controller 220, and localized TEC devices 230 described above with reference to FIGS. 2A-2B.

Figure 7:
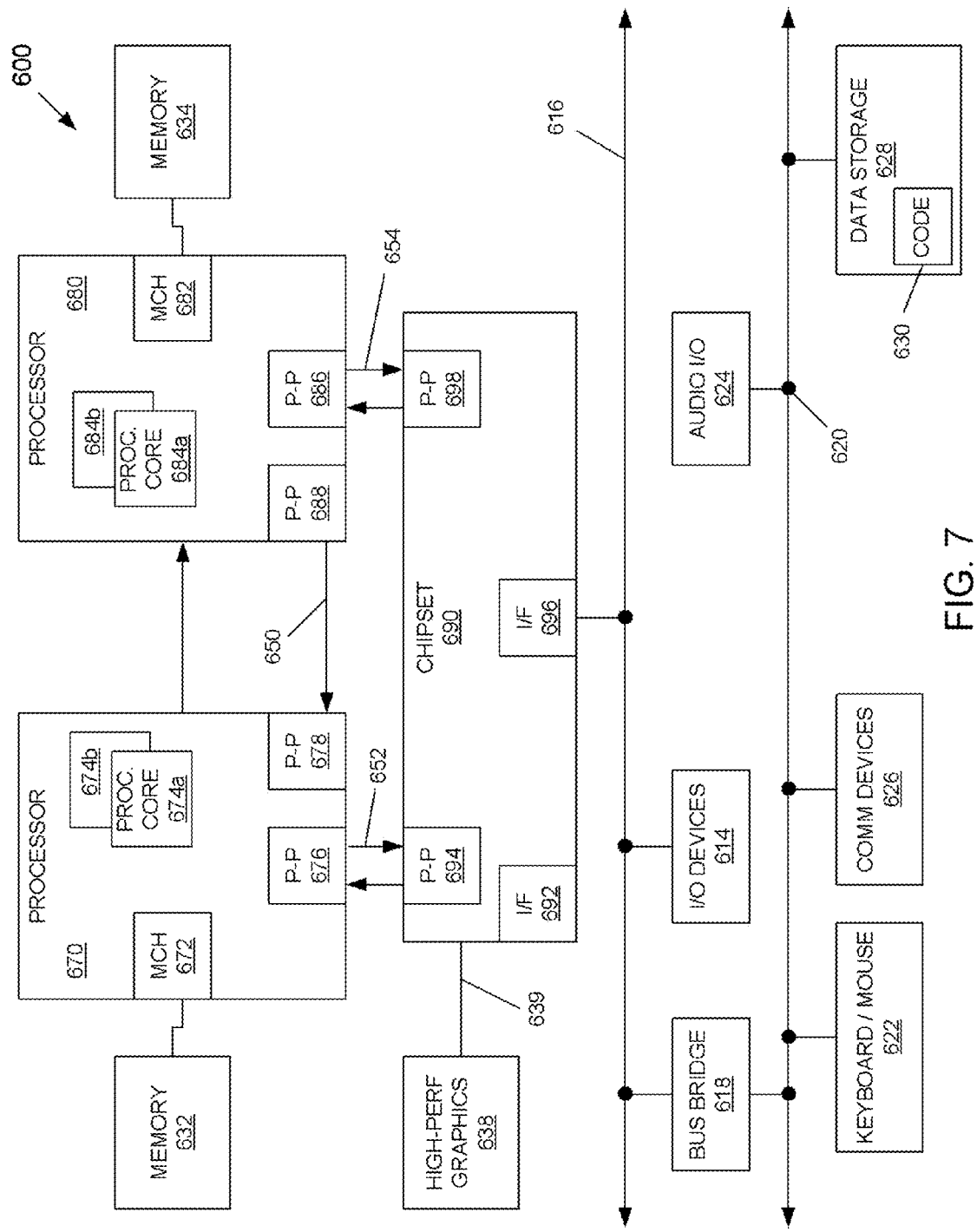
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674*a* and 674*b* and processor cores 684*a* and 684*b*), although potentially many more cores may be present in the processors.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Although not shown for ease of illustration in FIG. 7, in some embodiments, any portion of the multiprocessor system 600 may include some or all of the functionality of the TEC controller 120 and/or the TEC device 130 described above with reference to FIGS. 1A-1C. Further, in some embodiments, any portion of the multiprocessor system 600 may include some or all of the functionality of the IM logic 240, prediction logic 250, TEC controller 220, and localized TEC devices 230 described above with reference to FIGS. 2A-2B.

It should be understood that a processor core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Any processor described herein may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor may be a part of and/or may be implemented on one or more substrates using any of a number of process technologies, such as, for example, BiCMOS, CMOS, or NMOS.

It is contemplated that the processors described herein are not limited to any system or device. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 8:
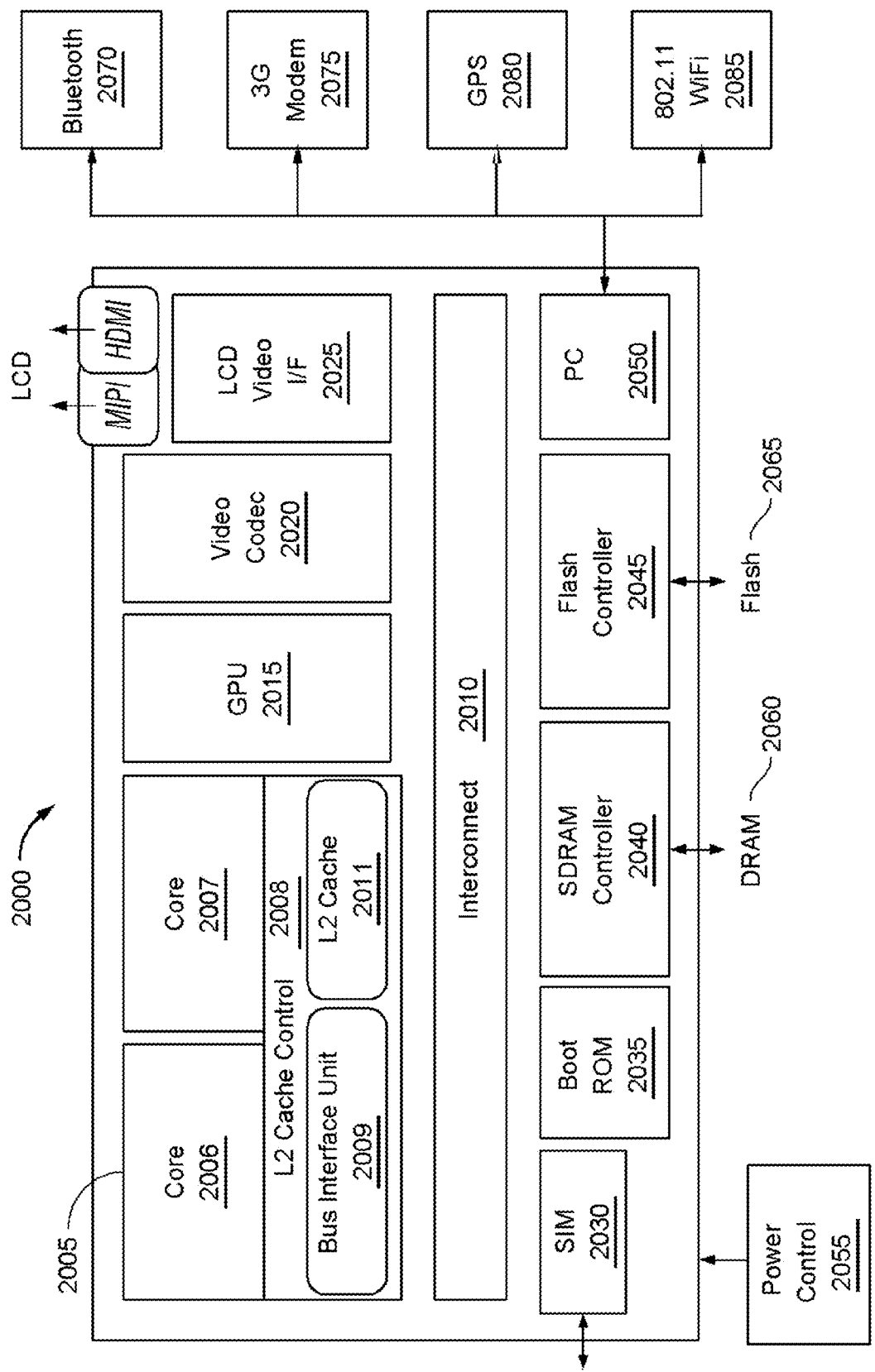
FIG. 8 is a block diagram of a system on a chip in accordance with an embodiment of the present invention.

Turning next to FIG. 8, an example of a system on-chip (SOC) design in accordance with some embodiments is depicted. As a specific illustrative example, SOC 2000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network. In some embodiments, SOC 2000 may include some or all of the functionality of the TEC controller 120 and/or the TEC device 130 described above with reference to FIGS. 1A-1C. Further, in some embodiments, any portion of the SOC 2000 may include some or all of the functionality of the IM logic 240, prediction logic 250, TEC controller 220, and localized TEC devices 230 described above with reference to FIGS. 2A-2B.

Here, SOC 2000 includes 2 cores—2006 and 2007. The cores 2006 and 2007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 2006 and 2007 are coupled to cache control 2008 that is associated with bus interface unit 2009 and L2 cache 2011 to communicate with other parts of system 2000. Interconnect 2010 includes an on-chip interconnect, such as an IOSF, AMBA, or any other interconnect, which potentially implements one or more aspects of the described invention.

Interface 2010 provides communication channels to the other components, such as a Subscriber Identity Module (SIM) 2030 to interface with a SIM card, a boot ROM 2035 to hold boot code for execution by cores 2006 and 2007 to initialize and boot SOC 2000, a SDRAM controller 2040 to interface with external memory (e.g. DRAM 2060), a flash controller 2045 to interface with non-volatile memory (e.g. Flash 2065), a peripheral control Q1650 (e.g. Serial Peripheral Interface) to interface with peripherals, video codecs 2020 and Video interface 2025 to display and receive input (e.g. touch enabled input), GPU 2015 to perform graphics related computations, etc.

In addition, the system illustrates peripherals for communication, such as a Bluetooth module 2070, 3G modem 2075, GPS 2085, and WiFi 2085. Note that a UE includes a radio for communication. As a result, these peripheral communication modules are not all required. However, in a UE some form a radio for external communication is to be included.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following clauses and/or examples pertain to further embodiments. In one example embodiment may be a processor including a thermoelectric cooling (TEC) controller. The TEC controller may be to: obtain a platform cooling level associated with the processor; obtain a temperature associated with the processor; calculate a TEC power level based at least in part on the platform cooling level and the temperature; and provide the TEC power level to a TEC device associated with the processor, where the TEC device is to transfer heat from the processor to a heat sink.

In an example, the platform cooling level is a first level for a fan providing an air flow to the heat sink.

In an example, the TEC controller may be further to calculate a second level for the fan.

In an example, the TEC controller may be further to calculate a virtual temperature based on the second level for the fan.

In an example, the TEC controller may be further to store the virtual temperature in a register accessed by a platform cooling logic.

In an example, the TEC device may be to provide a first heat flow from the processor to the heat sink.

In an example, the TEC controller may be to calculate the TEC power level by balancing the first heat flow with a convective heat flow associated with the air flow. In an example, the TEC controller may be to balance the first heat flow and the convective heat flow using a balancing algorithm.

In an example, the TEC controller may be further to generate a duty cycle signal based on the TEC power level. In an example, the TEC controller may be further to switch a power input to the TEC device using the duty cycle signal. In an example, the duty cycle signal is a pulse width modulated (PWM) signal.

In another example embodiment may be a processor including a plurality of cores to execute a plurality of instructions; a first thermoelectric cooling (TEC) device to provide localized cooling to a first core of the plurality of cores; logic to determine a predicted heat load on the first core associated with executing a first portion of the plurality of instructions; and a TEC controller to control, based on the predicted heat load, a power level of the first TEC device when the first core is executing the first portion of the plurality of instructions.

In an example, at least one of the plurality of cores comprises: at least one core component; and a second TEC device to provide localized cooling to the at least one core component.

In an example, the processor may also include at least one uncore component; and a third TEC device to provide localized cooling to the at least one uncore component.

In an example, each core of the plurality of cores may include instruction monitoring logic to monitor one or more instructions to be executed by the core.

In an example, the processor may be coupled to a dynamic random access memory (DRAM).

In another example embodiment may be a method to control thermoelectric cooling, the method including: determining a current level of a platform cooling device; determining a temperature of an electronic device; calculating, based at least on the current level and the temperature, a power level for a thermoelectric cooling (TEC) device, where the TEC device is to transfer heat from the electronic device to the platform cooling device.

In an example, the method may also include calculating a second level of the platform cooling device.

In an example, the method may also include programming the second level using a dedicated interface to the platform cooling device.

In an example, calculating the power level for the TEC device may include balancing a cooling effect of the TEC device with a cooling effect of the platform cooling device. In an example, balancing the cooling effect of the TEC device with the cooling effect of the platform cooling device may include using a balancing algorithm.

In another example embodiment may be a method to provide localized cooling, the method including: receiving a plurality of instructions to be executed by a plurality of cores; determining a predicted heat load on a first core of the plurality of cores, the predicted heat load associated with executing a first portion of the plurality of instructions; and based on the predicted heat load, controlling a power level of a thermoelectric cooling (TEC) device when the first core is executing the first portion of the plurality of instructions, the TEC device to provide localized cooling to the first core.

In an example, the method may also include monitoring one or more instructions to be executed by each of the plurality of cores.

In an example, the method may also include controlling a power level of a second TEC device to provide localized cooling to at least one core component.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments for the sake of illustration, those skilled in the art will appreciate numerous modifications and variations therefrom. It is intended that the appended claims cover all such modifications and variations as fall within the true spirit and scope of this present invention.

What is claimed is:

1. A processor comprising:
a thermoelectric cooling (TEC) controller to:
obtain a platform cooling level for a platform cooling device associated with the processor;
obtain a temperature associated with the processor;
calculate a TEC power level based at least in part on the platform cooling level and the temperature; and
provide the TEC power level to a TEC device associated with the processor, wherein the TEC device is to transfer heat from the processor to a heat sink cooled by the platform cooling device.

2. The processor of claim 1, wherein the platform cooling device is a fan providing an air flow to the heat sink, wherein the platform cooling level is a first level for the fan.

3. The processor of claim 2, wherein the TEC controller is further to calculate a second level for the fan.

4. The processor of claim 3, wherein the TEC controller is further to calculate a virtual temperature based on the second level for the fan.

5. The processor of claim 4, wherein the TEC controller is further to store the virtual temperature in a register accessed by a platform cooling logic.

6. The processor of claim 2, wherein the TEC device is to provide a first heat flow from the processor to the heat sink.

7. The processor of claim 6, wherein the TEC controller is to calculate the TEC power level by balancing the first heat flow with a convective heat flow associated with the air flow.

8. The processor of claim 7, wherein the TEC controller is to balance the first heat flow and the convective heat flow using a balancing algorithm.

9. The processor of claim 1, wherein the TEC controller is further to generate a duty cycle signal based on the TEC power level, wherein the duty cycle signal comprises a plurality of pulses.

10. The processor of claim 9, wherein the TEC controller is further to switch a power input to the TEC device using the duty cycle signal.

11. The processor of claim 9, wherein the duty cycle signal is a pulse width modulated (PWM) signal.

12. A processor comprising:
a plurality of cores to execute a plurality of instructions;
a first thermoelectric cooling (TEC) device to provide localized cooling to a first core of the plurality of cores;
logic to determine a predicted heat load on the first core associated with executing a first portion of the plurality of instructions; and
a TEC controller to control, based on the predicted heat load, a power level of the first TEC device when the first core is executing the first portion of the plurality of instructions.

13. The processor of claim 12, wherein at least one of the plurality of cores comprises:
at least one core component; and
a second TEC device to provide localized cooling to the at least one core component.

14. The processor of claim 12, further comprising:
at least one uncore component; and
a third TEC device to provide localized cooling to the at least one uncore component.

15. The processor of claim 12, wherein each core of the plurality of cores includes instruction monitoring logic to monitor one or more instructions to be executed by the core.

16. The processor of claim 12, wherein the TEC controller is further to switch a power input to the first TEC device using a duty cycle signal comprising a plurality of pulses.

17. A method, comprising:
determining, using a thermoelectric cooling (TEC) controller, a current level of a platform cooling device;
determining a temperature of an electronic device;
calculating, based at least on the current level and the temperature, a power level for a TEC device, wherein the TEC device is to transfer heat from the electronic device to the platform cooling device.

18. The method of claim 17, further comprising calculating a second level of the platform cooling device.

19. The method of claim 18, further comprising programming the second level using a dedicated interface to the platform cooling device.

20. The method of claim 18, wherein calculating the power level for the TEC device comprises balancing a cooling effect of the TEC device with a cooling effect of the platform cooling device.

* * * * *